United States Patent [19]

Michellone et al.

[11] 3,877,757

[45] Apr. 15, 1975

[54] METHOD OF AND INSTALLATION FOR BRAKING SO AS TO PREVENT THE WHEELS FROM SKIDDING

[75] Inventors: Giancarlo Michellone, Cambiano; Mario Palazzetti, Turin, both of Italy

[73] Assignee: FIAT Societa per Azioni, Turin, Italy

[22] Filed: June 27, 1973

[21] Appl. No.: 374,164

Related U.S. Application Data

[63] Continuation-in-part of Ser. No. 110,232, Jan. 27, 1971, abandoned.

[30] Foreign Application Priority Data

Feb. 3, 1970 Italy .................................. 67328/70

[52] U.S. Cl. ............................................. 303/21 F
[51] Int. Cl. ................................................ B60t 8/12

[58] Field of Search .................... 303/21; 188/181 A

[56] References Cited
UNITED STATES PATENTS

| | | | |
|---|---|---|---|
| 3,306,677 | 2/1967 | Dewar et al. .................. | 303/21 FM |
| 3,486,800 | 12/1969 | Ayers ............................ | 303/21 FM |
| 3,495,879 | 2/1970 | Sharp .............................. | 303/21 F |

*Primary Examiner*—Duane A. Reger
*Attorney, Agent, or Firm*—Sughrue, Rothwell, Mion, Zinn and Macpeak

[57] ABSTRACT

A braking pressure is discharged and restored in accordance with the dynamic states of a wheel. The braking pressure at which the first release command was given is stored and in the subsequent cycles the braking pressure is reduced proportionally to the said memorized value.

3 Claims, 3 Drawing Figures

METHOD OF AND INSTALLATION FOR BRAKING SO AS TO PREVENT THE WHEELS FROM SKIDDING

CROSS-REFERENCE TO RELATED APPLICATION

This application is a Continuation-in-Part of U.S. Pat. Application Ser. No. 110,232 filed Jan. 27, 1971 and now abandoned.

BACKGROUND OF THE INVENTION

1. Field of the Invention

The present invention relates to a method of braking vehicles which is adapted to prevent the wheels of the vehicle from skidding, or an anti-skid braking method, which latter expression will be used hereinafter.

The invention also concerns a braking apparatus for carrying this method into effect.

2. Prior Art

Anti-skid braking systems generally comprise a control unit which, in accordance with the dynamic states of one or more wheels, supplies braking and release signals to an actuating unit during a braking operation, when this is called for by the said dynamic states of the wheels.

A main disadvantage of the known braking apparatus consists in the excessive variation of the braking pressure durning the anti-skid braking and release cycles. This caused jolting of the vehicle during braking, dangerous effects of the braking operations on the steering, and impairment of braking efficiency. It is therefore desirable to restrict the variation of the braking pressure during the said braking and release cycles, in order to obtain gentler braking operations which are free from the aforesaid disadvantages.

SUMMARY OF THE INVENTION

A main object of the present invention therefore consists in providing an anti-skid braking method in which the jolting of the vehicle during braking is reduced.

A further object of the invention is to provide an anti-skid braking method for vehicles, in which the undesirable effects of the braking operations on the steering are very greatly reduced.

Another object of the invention is to provide a braking apparatus which will carry a method of the aforesaid type into effect.

The invention achieves the aforesaid and other objects by means of a method of anti-skid braking of vehicles, in which a braking pressure is discharged and restored in accordance with dynamic states of at least one wheel, characterized in that the braking pressure value at which the first release command was received is memorized and in the subsequent cycles the delivery pressure is reduced before being applied to the brakes, the reduction ratio being proportional to the said memorized value.

The invention also envisages an anti-skid braking apparatus for vehicles which is adapted to carry a method of the aforesaid type into effect, comprising a solenoid operated valve which in a first cycle of operation receives a delivery pressure and normally applies this pressure to a power cylinder and also to a storage valve charging a container, through a rapid-discharge pressure reducing valve controllable by a control pressure, and, on receiving an electrical command given in response to dynamic states of at least one wheel of the vehicle, interrupts the delivery pressure to the power cylinder, to the pressure reducing valve and to the storage valve. The pressure in the power cylinder is discharged through the rapid discharge outlet of the said pressure reducing valve and the storage valve establishes communication between the container and a control inlet of the pressure reducing valve to control the reduction ratio of this valve for the subsequent cycles of operation of the electrically operated valve.

BRIEF DESCRIPTION OF THE DRAWINGS

The invention is hereinafter illustrated in and described with reference to the accompanying drawings, in which.

DETAILED DESCRIPTION OF THE INVENTION

Figure 1:
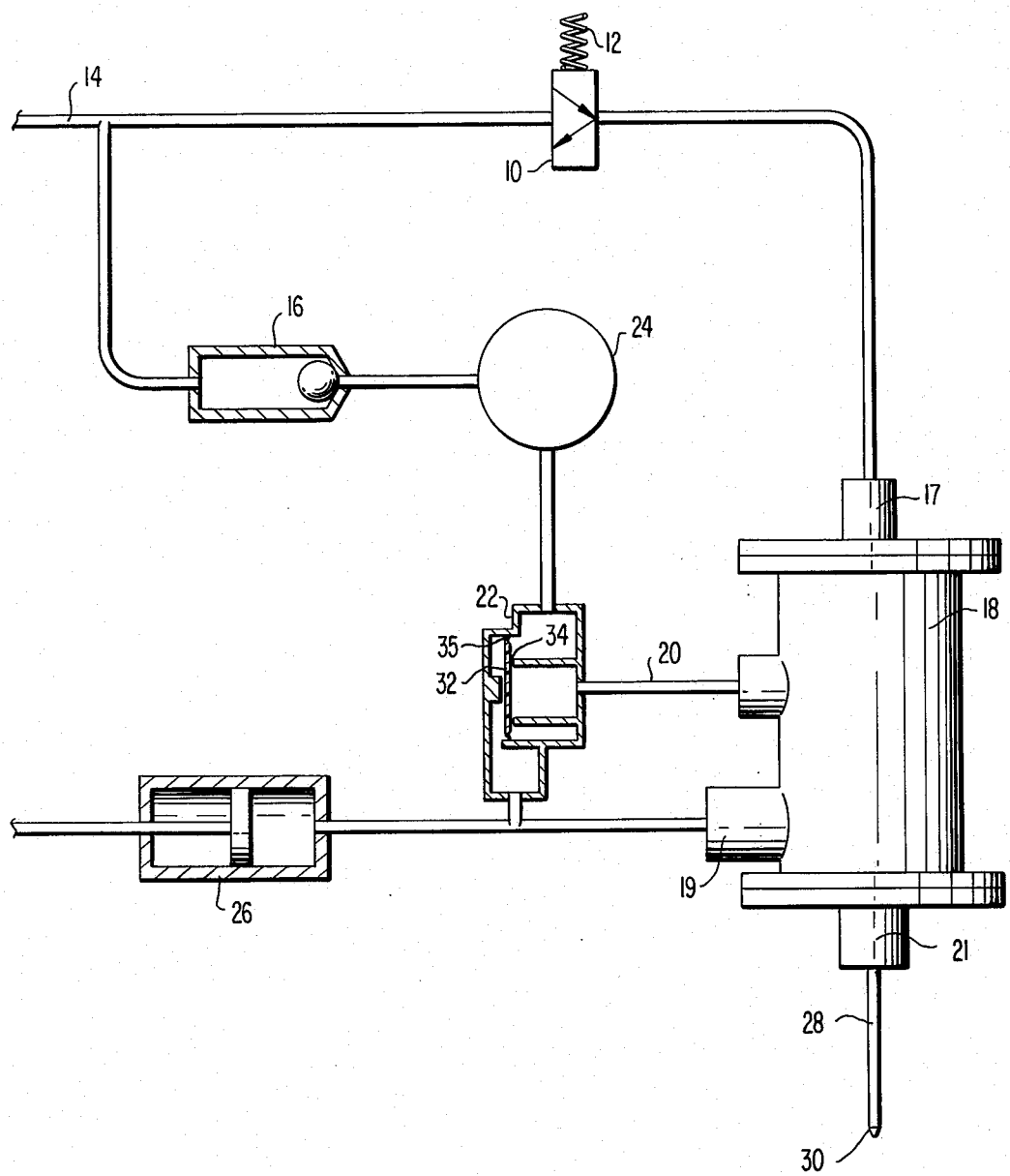
FIG. 1 is a diagrammatic illustration of an embodiment of a pneumatic anti-skid braking apparatus in accordance with the invention.

A pneumatic anti-skid braking installation in accordance with the invention will be described with reference to FIG. 1. A solenoid operated three-way valve 10 with two positions is controlled by a coil 12 and receives a delivery pressure from a duct 14. The delivery pressure is also supplied to a check valve 16, for reasons described hereinafter. From the solenoid operated valve 10 the delivery pressure passes to an admission inlet 17 of a rapid-discharge pressure reducing valve 18 controllable by a control pressure at 20. An outlet 19 of the valve 18 leads to a brake cylinder 26, whereas the rapid discharge outlet 21 of this valve leads to a container 28 having a fixed capacity and provided with a terminal throttling hole 30 leading into the atmosphere; this valve also communicates with a storage control valve 22 and, via the storage control valve, with a container 24.

The valve 18 is a rapid-discharge pressure reducing valve of which the reduction ratio can be controlled by means of a control pressure applied in the inlet 20, and according to a preferred embodiment of the invention this valve is of the type described and illustrated in U.S. Pat. No. 3,702,622 granted to Giancarlo Michellone on Nov. 14, 1972 entitled "Pneumatic Pressure Reducing Valve With Rapid Discharge".

When pressure is first applied to the duct 14, the pressure passes through the solenoid operated valve 10 normally open to the delivery and passes through the valve 18 on the one hand to the brake cylinder 26 and on the other hand to storage control valve 22 where it pushes a circular diaphragm 32 against an annular seat 34. The flexible lip 35 on the diaphragm 32 is normally disposed in sealing engagement with the wall of the valve housing. However, this flexible lip 35 will yield under pressure in this direction, thereby permitting the passage of pressurized air from the brake cylinder 26 to the container 34 thereby charging the container 24 while maintaining blockage of communication between the container 24 and the control inlet 20. When the coil 12 is energized by an anti-skid control signal applied by known means not shown in the drawing, the valve 10 is moved to its second position in which it shuts the delivery pressure off from the duct 14. There is therefore no pressure in the admission inlet 17 of the rapid discharge valve 18 and the pressure in the brake cylinder 26 is discharged through the rapid discharge outlet 21 into the container and throttle unit 28, 30. Therefore, the discharge at first, proceeds in accordance with a fast exponential law, and in a second period, when the container 28 has been charged and if the release situation continues, it proceeds in accordance with a slower law due to the slow discharge into the atmosphere through the throttle 30.

Generally, however, the dimensions of the container and the throttle are made such that for a ground with normal grip, the coil 12 is normally de-energized before the container is completely charged, whereas, in the case of particularly slippery ground (ice or the like), the throttle permits discharge down to lower pressures, even to zero pressure, if necessary. In this way, the pressure is prevented from falling to zero (this is undesirable because it causes shocks and jolting of the vehicle) when the ground provides a relatively good grip and the working pressures are relatively high, whereas the pressures are permitted to fall to low values when this is required, on a ground which provides little grip.

From the moment at which the delivery pressure downstream from the solenoid operated valve 10 and the pressure reducing valve has fallen below the maximum value, the pressure in the container 24 moves the diaphragm 32 away from the seat 34 and reaches the inlet 20 of the valve 18, increasing the reduction ratio of this valve proportionally to the value of the pressure stored in the container 24.

The flexible lip 35 of the diaphragm 32 is forced into sealing engagement with the wall of the valve housing by pressure in this direction to prevent communication of pressurized air from container 24 to the brake 26. Therefore, when subsequent release commands energize the coil 12 the pressure applied to the brake cylinder 26 will be less than the maximum value assumed by the pressure in the first cycle. Consequently, the discharge of the pressure in the second cycle will take place more rapidly and with less change in the pressure; the effectiveness of the anti-skid braking and release cycles will be greater and the shocks and jolting and all other disadvantages due to excessive changes in the braking pressure, will be less.

The check valve 16 allows the pressure stored in the container 24 to be discharged as soon as there is no delivery pressure in the duct 14, that is to say as soon as the brake pedal is released.

Figure 2:
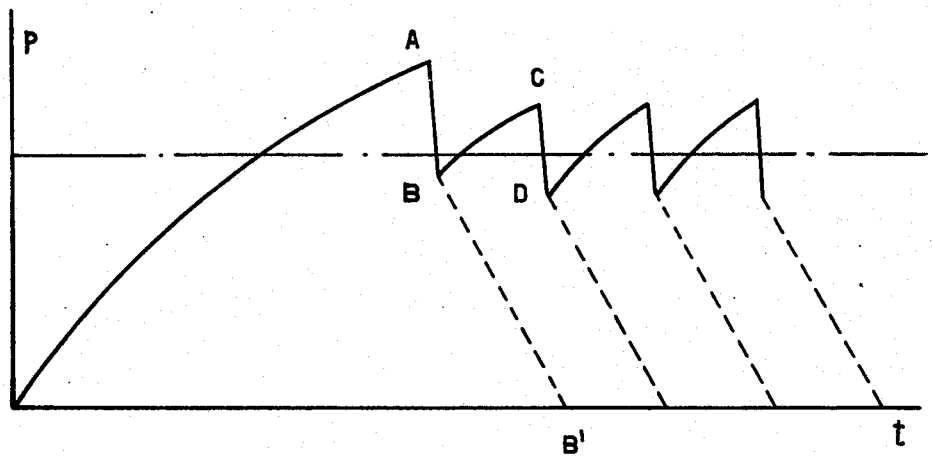
FIG. 2 is a graph of the pressure as a function of time during a braking operation on ground with a high grip coefficient.
Figure 3:
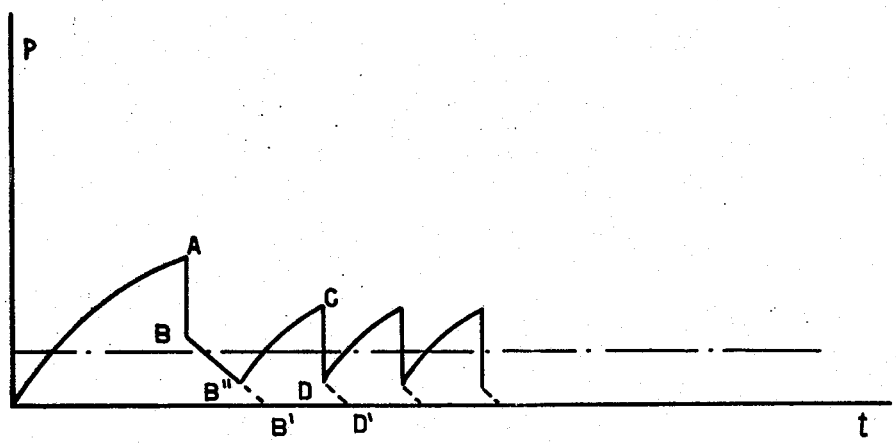
FIG. 3 is a graph of the pressure on the brakes as a function of time during a braking operation on a slippery ground.

In FIGS. 2 and 3, respectively, the variations in the braking pressure during a typical braking operation on ground with normal grip and on ground with little grip are shown. The level $a$ indicates the skid limit pressure which for the sake of simplicity is assumed to be constant during the braking operation. The pressure, after having reached a maximum value at the point A, is discharged down to a value B (or B" in FIG. 3, in the case in which the throttle 30 operates) which is below the threshold $a$. In the next cycle, the pressure rises to a value corresponding to the point C, which is less than the maximum value in the preceding cycle, after which the subsequent cycles are all substantially the same. The curve sections B-B', D-D' and the like, shown in broken lines, represents the course that the pressure would follow if the throttle 30 were to operate.

The invention has been described and illustrated with reference to a preferred embodiment which is a pneumatic apparatus but it is to be understood that the invention is also applicable to hydraulic or other systems and that numerous changes and modifications can be made without departure from the scope of the invention.

What is claimed is:

1. An anti-skid braking apparatus for vehicles comprising fluid operated brake means, supply means for supplying delivery pressure to said brake means, conduit means connecting said supply means and said brake means, solenoid operated valve means responsive to the dynamic state of at least one vehicle wheel disposed in said conduit means for controling the application of said delivery pressure to said brake means, rapid discharge pressure reducing valve means disposed in said conduit means intermediate said solenoid operated valve means and said brake means, storage means operatively connected to said conduit means intermediate said rapid discharge pressure reducing valve means and said brake means, said storage means comprising a container means and the storage control valve means, said rapid discharge pressure reducing valve means having control means for controlling the reduction ratio of the valve, additional conduit means connecting said storage control valve means to said control means whereby fluid under pressure may be supplied through said solenoid operated valve means in its open condition, through said rapid discharge reducing valve means to said brake means and to said container means through said storage control valve means, said fluid in said brake means being discharged through said rapid discharge reducing valve means and said fluid in said container means being applied to said control means upon closing of said solenoid operated valve means to provide for a reduction of the fluid pressure supplied to said brake means through said rapid discharge reducing valve means upon reopening of said solenoid operated valve means.

2. An apparatus as set forth in claim 1 further comprising check valve means disposed in a conduit intermediate said container means and said conduit means intermediate said supply means and said solenoid operated valve means to provide for the discharge of fluid under pressure from said container means upon removal of fluid pressure in said conduit means.

3. An apparatus as set forth in claim 2 wherein said rapid discharge pressure reducing valve means is provided with a discharge container having a throttling outlet.

* * * * *